United States Patent
Seo et al.

(10) Patent No.: US 7,936,438 B2
(45) Date of Patent: May 3, 2011

(54) LIQUID CRYSTAL DISPLAY AND METHOD FOR MANUFACTURING THE SAME

(75) Inventors: Hyeon Jin Seo, Gumi-si (KR); Jeong Hoon Lee, Gumi-si (KR); Dhang Kwon, Daejeon-si (KR); Hang Sup Cho, Gumi-si (KR); Ho Su Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 253 days.

(21) Appl. No.: 12/285,135

(22) Filed: Sep. 29, 2008

(65) Prior Publication Data

US 2009/0086136 A1    Apr. 2, 2009

(30) Foreign Application Priority Data

Oct. 2, 2007   (KR) .................. 10-2007-0099488

(51) Int. Cl.
    *G02F 1/1339*    (2006.01)
(52) U.S. Cl. ........................ 349/157; 349/155
(58) Field of Classification Search .................. 349/155, 349/157
    See application file for complete search history.

(56) References Cited

U.S. PATENT DOCUMENTS

| | | | | |
|---|---|---|---|---|
| 5,119,218 A * | 6/1992 | Yoshimoto et al. | ............. | 349/41 |
| 5,946,069 A * | 8/1999 | Toko | ............. | 349/155 |
| 6,064,461 A * | 5/2000 | Nishida | ............. | 349/155 |
| 6,466,295 B1 * | 10/2002 | Hsieh | ............. | 349/155 |
| 6,504,591 B1 * | 1/2003 | Kondo et al. | ............. | 349/123 |
| 7,492,435 B2 * | 2/2009 | Jeon | ............. | 349/155 |
| 7,557,893 B2 * | 7/2009 | Kim et al. | ............. | 349/155 |
| 7,570,338 B2 * | 8/2009 | Yoon et al. | ............. | 349/155 |
| 7,659,960 B2 * | 2/2010 | Doi et al. | ............. | 349/155 |
| 7,796,233 B2 * | 9/2010 | Park et al. | ............. | 349/155 |
| 2004/0233377 A1 * | 11/2004 | Utsumi et al. | ............. | 349/155 |
| 2005/0270468 A1 * | 12/2005 | Choi et al. | ............. | 349/155 |
| 2006/0209247 A1 * | 9/2006 | Lee et al. | ............. | 349/155 |
| 2007/0002261 A1 * | 1/2007 | Lee et al. | ............. | 349/155 |
| 2007/0008479 A1 * | 1/2007 | Suh et al. | ............. | 349/155 |
| 2007/0146618 A1 * | 6/2007 | Hashimoto | ............. | 349/155 |
| 2007/0236645 A1 * | 10/2007 | Hashimoto | ............. | 349/155 |
| 2008/0266498 A1 * | 10/2008 | Kim et al. | ............. | 349/110 |
| 2008/0297704 A1 * | 12/2008 | Hashimoto | ............. | 349/106 |
| 2009/0073366 A1 * | 3/2009 | Kurozumi | ............. | 349/139 |
| 2009/0086151 A1 * | 4/2009 | Seo et al. | ............. | 349/155 |
| 2009/0091677 A1 * | 4/2009 | Cho et al. | ............. | 349/46 |

* cited by examiner

*Primary Examiner* — Rhonda S Peace

(74) *Attorney, Agent, or Firm* — McKenna Long & Aldridge LLP

(57) ABSTRACT

A liquid crystal display device includes a first substrate and a second substrate facing each other, a gate line and a common line arranged adjacent and parallel to each other on the first substrate, a data line crossing the gate line, a spacer comprising a plurality of balls, formed on the first or second substrate in a lower-height and flat region provided between the gate line and the common line, and a liquid crystal layer filled between the first substrate and the second substrate.

20 Claims, 9 Drawing Sheets

LIQUID CRYSTAL DISPLAY AND METHOD FOR MANUFACTURING THE SAME

This application claims the benefit of Korean Patent Application No. 2007-099488, filed on Oct. 2, 2007, which is hereby incorporated by reference for all purposes as if fully set forth herein.

BACKGROUND OF THE INVENTION

1. Field of the Invention

The present invention relates to a liquid crystal display (LCD) device. More particularly, the present invention relates to a liquid crystal display (LCD) device and a method for manufacturing the same, wherein spacers in the form of balls are formed in planarized regions to prevent occurrence of steps between the spacers and avoid spacer breakage caused by substrate sagging or vibration.

2. Discussion of the Related Art

With the progress of information-dependent society, the demand for various display devices has increased. To meet such a demand, efforts have recently been made to research flat panel display devices such as liquid crystal displays (LCDs), plasma display panels (PDPs), electro-luminescent displays (ELDs) and vacuum fluorescent displays (VFDs). Some types of such flat panel displays are being practically applied to various appliances for display purposes.

Of these, LCDs are currently most widely used as substitutes for cathode ray tubes (CRTs) in association with mobile image display devices because LCDs have advantages of superior picture quality, lightness, slimness, and low power consumption. Various applications of LCDs are being developed in association with not only mobile image display devices such as monitors of notebook computers, but also monitors of TVs to receive and display broadcast signals, and monitors of laptop computers.

Successful application of such LCDs to diverse image display devices depends on whether or not the LCDs can realize desired high picture quality including high resolution, high brightness, large display area, and the like, while maintaining desired characteristics of lightness, slimness and low power consumption.

Such a liquid crystal display device includes spacers arranged in regions where liquid crystals are filled between the upper and lower substrates that face each other in order to maintain the gap between the substrates. Examples of useful spacers include column spacers fixedly formed in the form of columns and ball spacers in the form of balls.

Hereinafter, a related art LCD device using a ball spacer will be described with reference to the annexed drawings.

FIG. 1 is a sectional view illustrating a related art ball spacer. FIGS. 2A and 2B are sectional views illustrating a phenomenon in which a ball moves and a substrate thus sags.

As shown in FIG. 1, in the liquid crystal display device using the ball spacer, the ball spacer 55 is arranged on the outermost surface of the structure which includes a gate line 51, a gate insulating film 52, a passivation film 53 and a first alignment film 54 arranged on a first substrate 50 in this order.

Meanwhile, as shown in FIGS. 2A and 2B, in the liquid crystal display device using the ball spacer, a black matrix layer 61, a color filter layer 62, an overcoat layer 63 and a second alignment film 64 are further formed in this order on a second substrate 60 that faces the first substrate 50 such that the ball spacer 55 is interposed between the first and second substrates.

The ball spacer 55 may be formed on the first alignment film 54 arranged above the first substrate 50, as shown in FIG. 1, or on the second alignment film 64 formed above the second substrate (represented by reference numeral "60" in FIG. 2A) that faces the first substrate 50.

The ball spacer 55 is formed though a dispersion method. In the dispersion process, the ball spacer is not fixed at the position where the ball spacer is formed, due to the spherical shape thereof, and rolls towards pixel regions, which serve to display an image, as well as the black matrix layer 61, thus causing light leakage. As shown in FIG. 2A, the ball spacer 55 moves down to the metal-free region such as the gate line 51, thus causing occurrence of a height difference between the top of the ball spacer 55 which is arranged in the initial position, and the top of the ball spacer 55 which is arranged in the final position. As shown in FIG. 2B, for the ball spacer 55 arranged in a lower level, the second substrate 60 that faces the ball spacer 55 sags, and the cell gap of this abnormal region (final position) is thus different from that of the normal region (initial position). Furthermore, the difference in the cell gap causes light passage differences, thus resulting in display of different images in respective regions, so-called "display defects".

As mentioned above, in addition to the problem in which ball spacers roll on the substrate surface where the ball spacers are dispersed, the ball spacers suffer from the problem in that, although being formed at desired positions, the ball spacers deviate from the positions due to external force applied during the manufacturing process or an impact applied in use and thus cause light leakage. That is, when the ball spacer 55 deviates from the original position, it comes out of the portion provided inside the black matrix layer 51 in the normal position and rolls toward the side of the portion. In addition, the ball spacer 55 that deviates from the original position involves further problems in that an aperture ratio is decreased due to the ball spacer 55 arranged out of regions provided by the black matrix layer, and scattering occurs on the surface of the ball spacer 55 which has moved into a pixel region. Furthermore, the ball spacer 55 arranged in the pixel region results in distorted orientation of liquid crystal, thus causing light leakage.

In addition, the movement of the ball spacer 55 may cause damage (e.g., tearing or distorted rubbing) to the surface of the second alignment film 64 that comes in contact with the ball spacer 55 in a dot-like area.

LCDs employing the afore-mentioned related art ball spacers suffer from the following problems.

First, the ball spacers are formed through a dispersion method, thus making it difficult to control the position of formation.

Second, in an attempt to control the position of the ball spacers formed in accordance with the dispersion method, column spacers have been suggested. The column spacers have large areas in contact with the substrate that face the column spacers, and thus high frictional forces, as compared to ball spacers. In this case, upon application of frictional force such as touch, upper and lower substrates shift in one direction, and then take a long time to return to original states thereof due to the high frictional force. In the process of returning to the original states, touch defects occur.

Third, although formed in the desired position, the ball spacers come out of the original positions due to impact or vibration in panel manufacture/assembly processes, thus causing reduction of aperture ratio and light leakage defects.

Fourth, when ball spacers move and repeatedly come in contact with the substrate surface (i.e., alignment film) that faces the ball spacers, the alignment film may be torn or the ball spacers may be broken.

SUMMARY OF THE INVENTION

Accordingly, the present invention is directed to a liquid crystal display (LCD) device and a method for manufacturing the same that substantially obviate one or more problems due to limitations and disadvantages of the related art.

An advantage of the present invention is to provide a liquid crystal display (LCD) device and a method for manufacturing the same, wherein spacers in the form of balls are formed in planarized regions to prevent occurrence of steps between the spacers, thus avoiding spacer breakage caused by substrate sagging or vibration.

Additional advantages and features of the invention will be set forth in part in the description which follows and in part will become apparent from the description or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a liquid crystal display device includes: a first substrate and a second substrate facing each other; a gate line and a common line arranged adjacent and parallel to each other on the first substrate; a data line crossing the gate line; a spacer comprising a plurality of balls, formed on the first or second substrate in a lower-height and flat region provided between the gate line and the common line; and a liquid crystal layer filled between the first substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to embodiments of the present invention, examples of which are illustrated in the accompanying drawings.

First Embodiment

Figure 1:
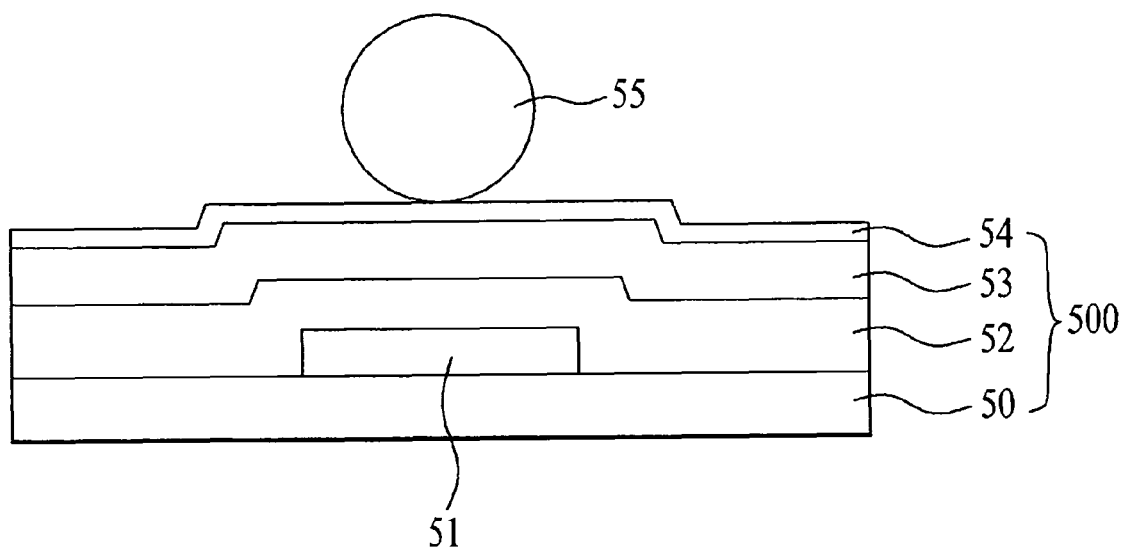
FIG. 1 is a sectional view illustrating a related art ball spacer.
Figure 2A:
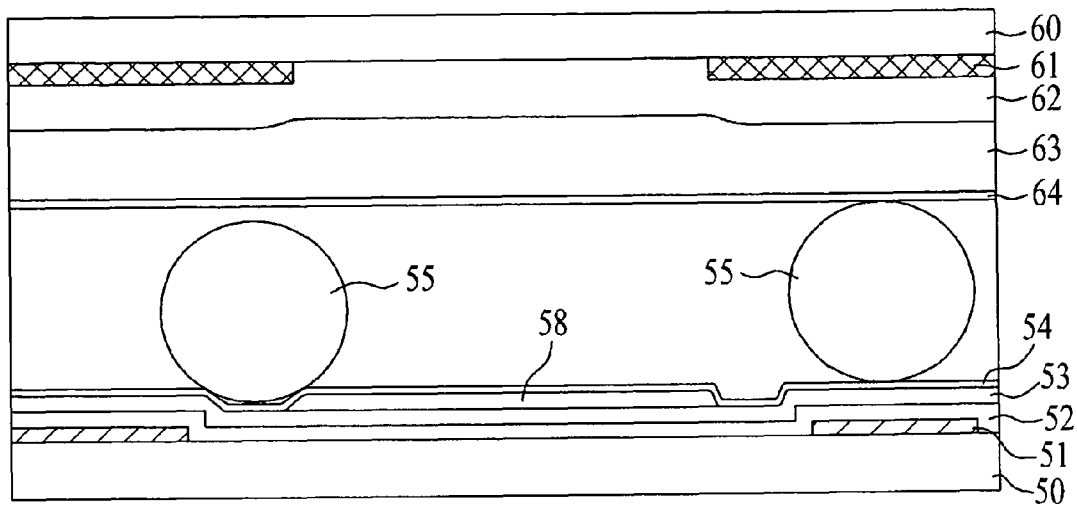
FIGS. 2A and 2B are sectional views illustrating phenomena in which a ball moves and a substrate thus sags.
Figure 2B:
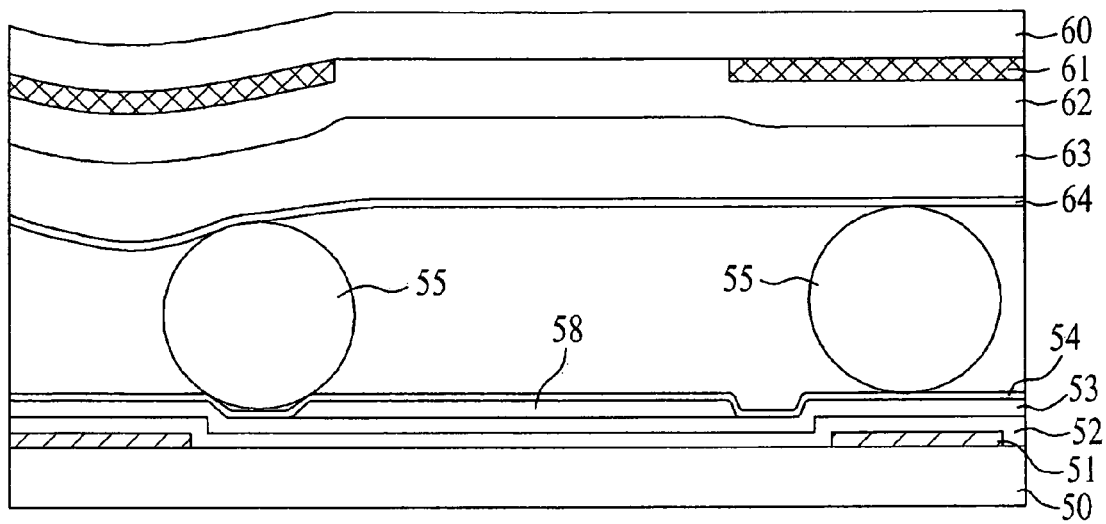
Figure 3:
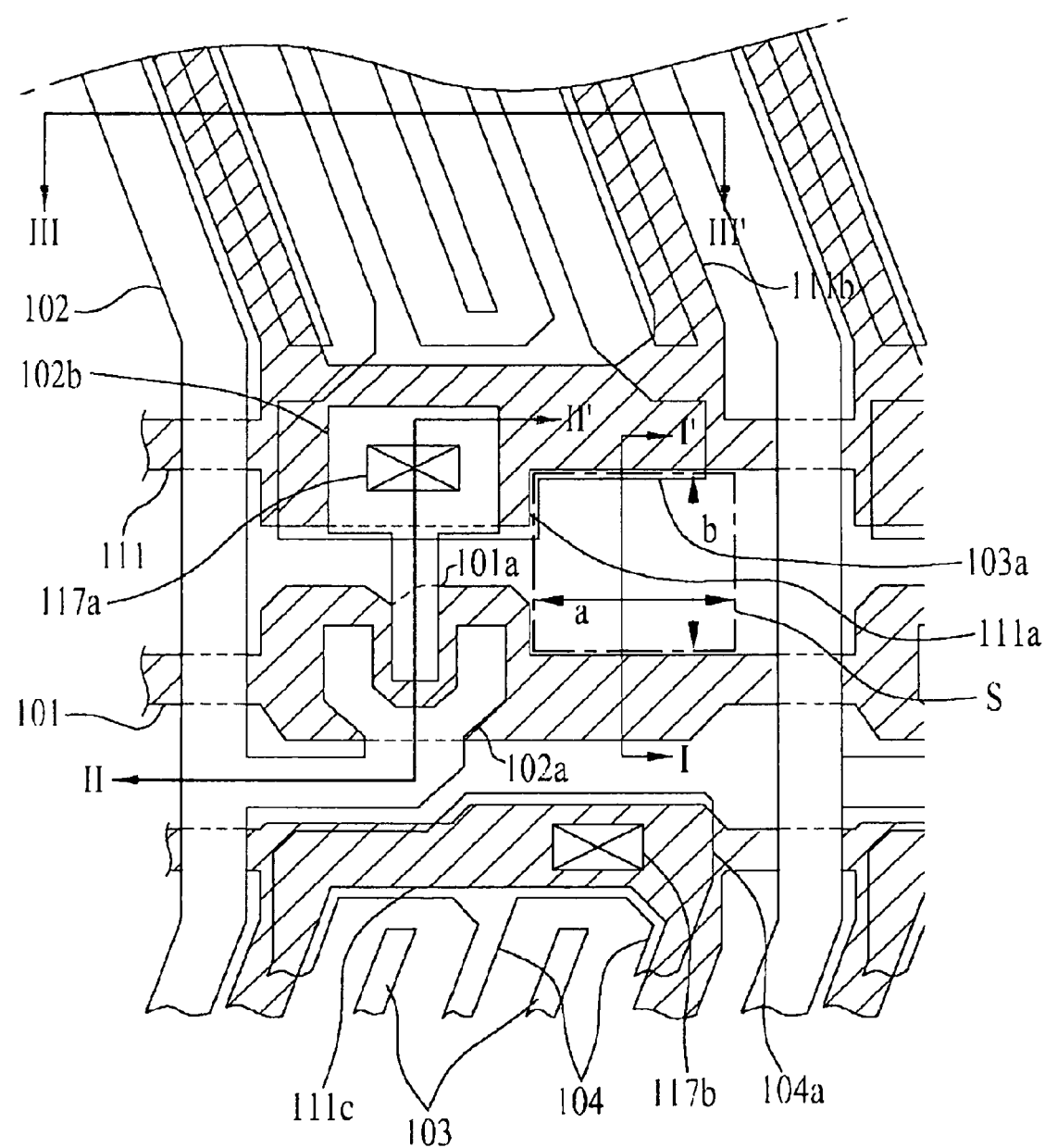
FIG. 3 is a plan view illustrating a liquid crystal display device according to first and second embodiments of the present invention.
Figure 4:
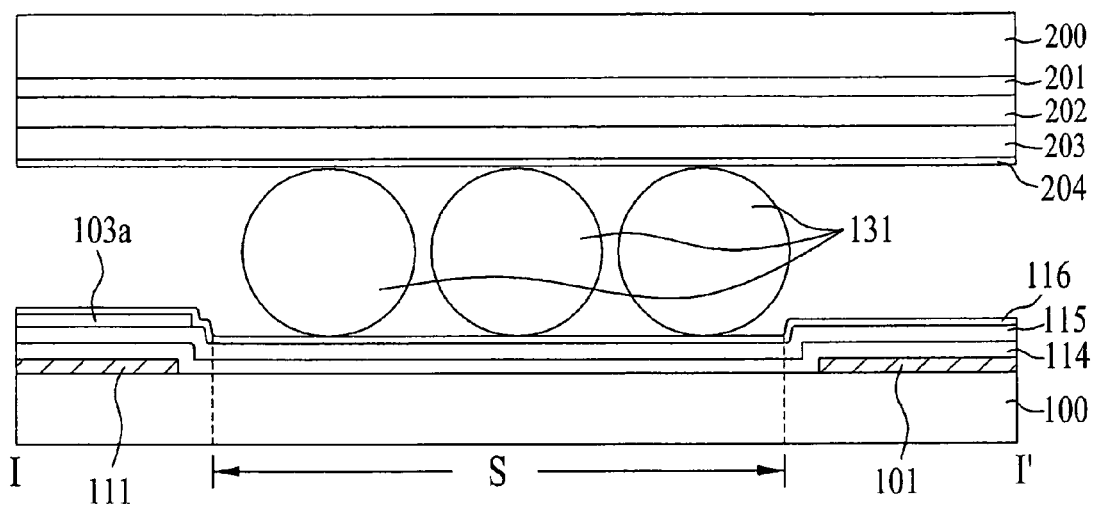
FIG. 4 is a sectional view illustrating the first embodiment, taken along the line I-I' of FIG. 3.
Figure 5:
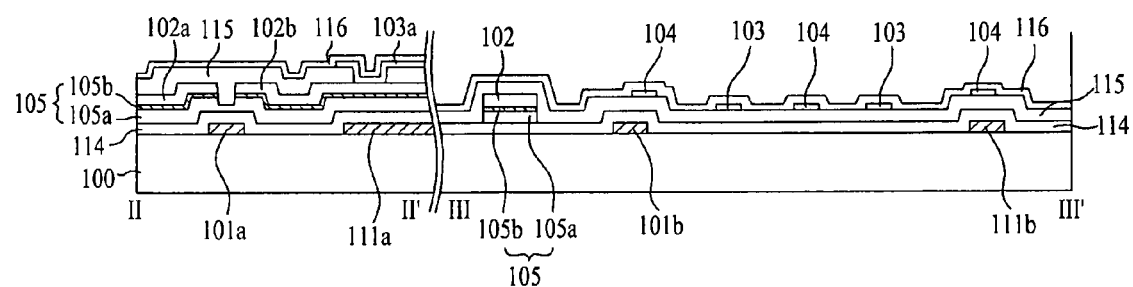
FIG. 5 is a sectional view taken along the lines II-II' and III-III' of FIG. 3.

FIG. 3 is a plan view illustrating the liquid crystal display device according to embodiments of the present invention. FIG. 4 is a sectional view illustrating a first embodiment of the present invention, taken along the line I-I' of FIG. 3. FIG. 5 is a sectional view taken along the lines II-II' and III-III' of FIG. 3.

As shown in FIGS. 3 to 5, the liquid crystal display device according to the first embodiment of the present invention includes: a first substrate 100 and a second substrate 200 that face each other; a plurality of gate lines 101 and a plurality of common lines 111 arranged on the first substrate 100 such that an associated one of the gate lines 101 and an associated one of the common lines 111 extend adjacent to and parallel to each other; a plurality of data lines 102 arranged such that an associated one of the data lines 102 crosses an associated one of the gate lines 111, a plurality of spacers, each composed of a plurality of balls 131, arranged on the first substrate 100 or the second substrate 200 in spacer-forming regions S, that are lower in height and flat, interposed between the gate line 101 and the common line 111; and a liquid crystal layer (not shown) filled between the first substrate 100 and the second substrate 200.

Each spacer-forming region S has a horizontal width "a" and a vertical width "b". As shown in FIG. 3, taking into consideration the fact that the spacer-forming region S is a flat region arranged between the gate line 101 and the common line 111, the spacer-forming region S may have a greater width in the horizontal direction. In other words, the horizontal width "a" may be greater than the vertical width "b". In addition, as shown in the drawing, the spacer-forming region has a square-like shape. The shape of the spacer-forming region is not limited thereto and may be a rectangle with a horizontal width greater than vertical width or a vertical width greater than horizontal width, or a polygon. That is, preferably, the spacer-forming region S is defined as a lower-height, flat and line-free region in the form of a figure that can be continuously formed, which is interposed between the gate line 101 and the common line 111 adjacent thereto.

The spacer-forming region used in experiments has a horizontal width "a" of 50 um and a vertical width "b" of 50 um. These dimensions are determined by taking the desired process margin into consideration, which are those of 23 inch TV test models and may be varied depending upon the size of models and design forms.

However, the region where the spacers comprising the balls 131 are to be formed cannot be sufficiently defined as the gap, i.e., about 10 um, between the gate line 101 and the common line 111. The gap between the gate line 101 and the common line 111 that are adjacent to the spacer-forming region S must be secured such that the pitch of one side thereof is about 20 um or more. In order to secure the spacer-forming region S in the plane (See FIG. 3), the gate line 101 or the common line 111 adjacent to the spacer-forming region S may have a depression in which the spacer comprising the plurality of balls 131 is embedded. It can confirmed from experiments that the lower-height and flat region with the depression provided between the gate line 101 and the common line 111 has an area with horizontal and vertical widths in the range of 20 to 100 um.

The diameter of the balls 131 corresponds to the cell gap, i.e., about 2.5 to 5 um. The cell gap of TN modes is larger than that of IPS modes. Accordingly, the ball diameter of TN modes is larger than that of IPS modes. The spacer-forming region has horizontal and vertical widths not smaller than 20 um, thus comprising the balls 131 with a diameter of 2.5 to 5 um.

The spacer containing the balls 13 is not necessarily distributed throughout the spacer-forming region S and may be formed in only a portion of the flat region between the gate line 101 and the common line 111 adjacent thereto.

The difference in level is present between the spacer-forming region S and the portion where the gate line 101 and the common line 111 adjacent to the region S are formed, which corresponds to the thickness of the gate line 101 (in this case, the gate line 101 and the common line 111 are made of a metal, which are on the same level). In other words, the spacer-forming region S is lower than the gate line 101 and the common line 111 and the height difference therebetween is comparable to the thickness of the gate line 101.

The spacer-forming material for the formation of the spacer 130 comprising the balls 131, which is a mixture consisting of a solvent as a liquid component and about 0.1 to 3 wt % of the balls 131, with respect to the total weight of the solvent, is supplied through a supply tank provided in an inkjet system into a head to spray the spacer-forming material in the spacer-forming region.

The spacer-forming material jetted in the spacer-forming region through the head of the inkjet system comprises a plurality of balls 131, is in a state of a liquid solvent mixed with a small amount of the balls 131, and is fixedly formed within the spacer-forming region S through the subsequent curing process. In the process of curing, the solvent is volatilized in the air through heating at 80 to 300° C.

The solvent is selected from those that have a boiling point of 60 to 300° C. For example, glycol ether may be used as the solvent. Examples of useful glycol ethers include propylene glycol methyl ether (PGME), dipropylene glycol methyl ether (DGME), tripropylene glycol methyl ether (TGME), propylene glycol methyl ether acetate (PGMEA), dipropylene glycol methyl ether acetate (DGMEA), propylene glycol n-propyl ether (PGPE), dipropylene glycol n-propyl ether (DGPE), propylene glycol n-butyl ether (PGBE), dipropylene glycol n-butyl ether (DGBE), tripropylene glycol n-butyl ether (TGBE), propylene glycol phenyl ether (PGPE), propylene glycol diacetate (PGD), dipropylene glycol dimethyl ether (DGDE), diethylene glycol ethyl ether (DGEE), diethylene glycol methyl ether (DGME), diethylene glycol n-butyl ether (DGBE), diethylene glycol hexyl ether (DGHE), diethylene glycol n-butyl ether acetate (DGBEA), ethylene glycol propyl ether (EGPE), ethylene glycol n-butyl ether (EGBE), ethylene glycol hexyl ether (EGHE), ethylene glycol n-butyl ether acetate (EGBEA), triethylene glycol methyl ether (TGME), triethylene glycol ethyl ether (TGEE), triethylene glycol n-butyl ether (TGBE), ethylene glycol phenyl ether (EGPE) and ethylene glycol n-butyl ether mixtures (EGBEM).

Preferably, the solvent has a surface tension of 20 to 80 dynes/cm, a viscosity of 1 to 30 cP and a density of 0.8 to 1.2 g/cc at ambient temperature. Based on these properties, the solvent is volatilized and removed during curing at about 80 to 300° C.

In addition, the balls 131 are made of an organic compound e.g. divinylbenzene. The balls 131 can be distinguished from other ingredients, in that the balls are present in the form of a white powder, while the solvent is in a liquid state. If necessary, the balls 131 may be subjected to surface-treatment prior to being mixed into the spacer-forming material so that they can be distinguished from the liquid component.

In addition, the spacer including the balls 131, as shown in the drawing, may be formed on the second alignment film 204. Alternatively, in reverse, after the spacer may be formed on the overcoat layer 203 or the common electrode, the second alignment film 204 may be formed on the overcoat layer 203 or the common electrode including the spacer 130.

Meanwhile, although the solvent is volatilized, the spacer-forming region S is lower than the gate line 101 and the common line 111 adjacent thereto and has a flat surface, and the component of the balls 131 contained in the spacer-forming material thus does not deviate from the spacer-forming region and stays therein.

Hereinafter, other constituent components of the first and second substrates 100 and 200 will be illustrated in detail with reference to the annexed drawings.

A gate insulating film 114 and a passivation film 115 are formed over the entire surface of the first substrate 100 such that they cover the gate lines 101 and the common lines 111 which are spaced apart from each other and extend in parallel to each other. Second storage electrodes 103a overlap the common lines 111 at respective pixel regions. A first alignment film 116 is formed over the entire surface of the passivation film 115 including the second storage electrodes 103a.

A black matrix layer 201, a color filter layer 202, an overcoat layer 203 and a second alignment film 204 are laminated in this order on the second substrate 200 in portions corresponding to the spacers comprising the balls 131.

The black matrix layer 201 may be formed in portions where the gate lines 101 and the data lines 102 are formed on the first substrate 100. The black matrix layer 201 may be further formed in portions provided by the common lines 111, and portions provided between the gate lines 101 and the common lines 111.

Referring to FIGS. 3 to 5, the structure provided on the first substrate 100 will be illustrated.

A plurality of gate lines 101 and a plurality of data lines 102 are arranged on the first substrate 100, such that the gate lines 101 and the data lines 102 intersect each other, to define pixel regions. In addition, common lines 111 are arranged on the first substrate 100 such that the common lines extend in parallel to the gate lines 101.

In addition, thin film transistors are located at respective intersections of the data lines 101 and the gate lines 102. Each thin film transistor includes: a gate electrode 101a protruding from the associated gate line 101; a gate insulating film 114 formed over the entire surface of the first substrate 100 including the gate electrodes 101a, the gate lines 101 and the common lines 111; a "U"-shaped source electrode 102a and a drain electrode 102b arranged at both sides of the gate electrode 101a such that the drain electrode 102b is partially located in the "U"-shaped source electrode 102a; and semiconductor layers 105 (105a, 105b) arranged in regions including portions under the source electrode 102a and the drain electrode 102b, and channel portions between the source electrode 102a and the drain electrode 102b. The semiconductor layers 105 include an amorphous silicon layer 105a and an impurity semiconductor layer (n+ layer) 105b arranged thereon. The impurity semiconductor layer 105b is formed by removing the channel region present between the source electrode 102a and the drain electrode 102b. The shape of the source electrode 102a is not limited to the "U"-shape and may be "-"- or "L"-shaped.

The data line 102 has a central bent portion at each sub-pixel such that the data line 102 forms a zigzag line. The common line 111 is integrally formed with a storage electrode 111a at each pixel and the storage electrode 111a is connected to a common electrode connection electrode 111b which lies adjacent to both sides of the data line 102 and protrudes in parallel to the data line 102. As mentioned above, the data line 102 crosses the gate line 101 and has a bent portion at each pixel. Exemplary embodiments of the present invention are not limited thereto and the data line may perpendicularly cross the gate line, or may be tilted at a predetermined angle with respect to the gate line. In the illustrated drawings, the reason for imparting the bent portion to the data line 102 at each pixel is that the common electrode 104 and the pixel electrode 103 extend in parallel to the data line, and a vertically symmetrical electric field is thus generated, on the basis of the bent portion, which allows for orientation of liquid crystals in different directions, thus leading to an improvement in viewing angle.

The common electrode 104 and the pixel electrode 103 are formed of transparent electrodes at the same level in pixel regions and have alternately arranged portions. The common electrode 104 is partially overlapped with the common electrode connection electrode 111b arranged thereunder. A second common electrode connection electrode 111c which extends in parallel to the gate line 101 has, as an electrical contact, a second contact portion 117b which passes through the passivation film 115 and the gate insulating film 114 interposed between the common electrode 104 and the second common electrode connection electrode 111c.

In addition, the pixel electrode 103 is branched from the second storage electrode 103a overlapping the first storage electrode 111a, and has, as an electrical contact, a first contact portion 117a which passes through the passivation film 115 interposed between the pixel electrode 103 and the drain electrode 102b.

The spacer-forming region S corresponds to the black matrix layer 201 on the second substrate 200, which is shielded by the black matrix layer 201, after joining of the first and second substrates 100 and 200, and thus prevents the problems such as light leakage.

A metal such as Mo, Al or Cr is deposited on a first substrate 100 and is then patterned through photolithographic processes to simultaneously form a plurality of gate lines 101, gate electrodes 101a, common lines 111 extending parallel to the gate lines 101, first storage electrodes 111a integrally formed with the common lines 111, and first common electrodes 111b and second common electrodes 111c branched from the first storage electrodes 111a and protruded in pixel regions. At this time, the gate electrodes 101a are formed in predetermined positions provided by pixel regions such that they are protruded from the gate lines 201, and the first storage electrodes 111a, the first common connection electrodes 111b and the second common connection electrodes 111c are formed in the boundaries between adjacent pixel regions. The first storage electrode 111a integrally formed with the common line 111 in each pixel region has a depression to define a spacer-forming region S, as shown in FIG. 3. Alternatively, the depression may be provided in the gate line 101 to define a spacer-forming region S. If needed, upon formation of the spacer-forming region S, the depression may be defined in both the gate lines 101 and the first storage electrodes 111a (or common lines). In this case, the size and position of the depression may be varied, depending upon the liquid crystal display model.

Then, an inorganic insulating material is deposited over the first substrate 100 provided with the gate lines 101, the common lines 111, the gate electrodes 101a, the first storage electrodes 111a, and the first and second common connection electrodes 111b and 111c, to form a gate insulating film 114.

Subsequently, an amorphous silicon layer 105a and an impurity semiconductor layer 105b are sequentially deposited on the gate insulating film 114.

A metal such as Mo, Al or Cr is deposited on the resulting structure and a photosensitive film is applied thereto. For example, the photosensitive film may be a negative photosensitive film.

The portions where the data lines, source electrodes and drain electrodes are formed define a light-transmission part, the channel portions of the semiconductor layers define a light-semi-transmission part, and the remaining portions defined a light-shielding part. In this regard, masks (not shown) defined as the light-shielding part are positioned on the photosensitive film.

Subsequently, the photosensitive film is exposed to light and is then developed through the masks, to form a first photosensitive film pattern such that the portions provided by the light-transmission part remain un-etched, the portions provided by the light-semi-transmission part are partially removed, and the portions provided by the light-shielding part are completely removed. The metal material is patterned using the first photosensitive film pattern (not shown) in accordance with photolithographic processes. The first photosensitive film pattern includes a first pattern which has a bent portion in each pixel region, while crossing the gate line 101, and a second pattern (corresponding to the light-transmission part where the source and drain electrodes are formed, including the light-semi-transmission part of the masks) which is connected to the first pattern at the intersection of the gate line 101 and extends toward the pixel region. After the patterning of the metal using the first photosensitive film pattern, data lines 102 which cross the gate lines 101 and have a bent portion at respective pixel regions are formed, and dummy patterns (not shown) connected to the data lines 102 are formed in portions corresponding to the second pattern.

Subsequently, the impurity semiconductor layer 105b and the amorphous silicon layer 105a are primarily selectively removed using the data lines 102 and the dummy patterns as masks.

Subsequently, with respect to the first photosensitive film pattern (not shown), the first photosensitive film pattern is subjected to ashing such that the photosensitive film provided by the light-semi-transmission part of the mask which has a relatively smaller thickness is removed, to form a second photosensitive film pattern (not shown).

Subsequently, the portions, where the metal material (the same layer as the data line 102) of the dummy pattern and the impurity semiconductor layer 105b are exposed, are selectively removed using the second photosensitive film pattern as a mask, to form source electrodes 102a and drain electrodes 102b and to pattern the impurity semiconductor layer 105b arranged thereunder. In this process, the impurity semiconductor layer 105b interposed between the source electrode 102a and the drain electrode 102b is removed. The removed region is defined as a channel portion. The source electrode 102a is formed in the "U" shape that protrudes from the data line 102 toward the pixel region. The drain electrode 102b is spaced apart from the source electrode 102a by a predetermined distance and is partially embedded in the "U" form of the source electrode 102a.

Subsequently, a passivation film 115 is deposited over the gate insulating film 114 provided with the data lines 102, the source electrodes 102a and the drain electrodes 102b. At this time, the passivation film 115 is generally made of an inorganic material e.g., $SiN_x$. In order to increase an aperture ratio of liquid crystal cells, low dielectric organic materials such as benzocyclobutene (BCB), spin on glass (SOG) and acryl may be used.

Subsequently, a portion of the passivation film 115 arranged on the drain electrode 102b is selectively etched to form a first contact portion 117a, and the passivation film 115 and the gate insulating film 114 provided in predetermined portions on the second common connection electrode 111c are selectively removed to form a second contact portion 117b.

Subsequently, a transparent electrode is deposited over the passivation film 115 including the first and second contact portions 117a and 117b and is then selectively removed, to form a plurality of common electrodes 104 which are partially overlapped with the common electrode connection electrodes 111b at respective pixels and spaced apart from one another, third common connection electrodes 104a overlapping the second common connection electrodes 111c and connecting the common electrodes 104 in pixel regions of the common electrodes 104, and a plurality of pixel electrodes 103 alternating with the common electrodes 104.

Subsequently, a first alignment film 116 is formed over the entire surface of the passivation film 115 including the pixel electrodes 103 and the common electrodes 104.

Second Embodiment

Figure 6:
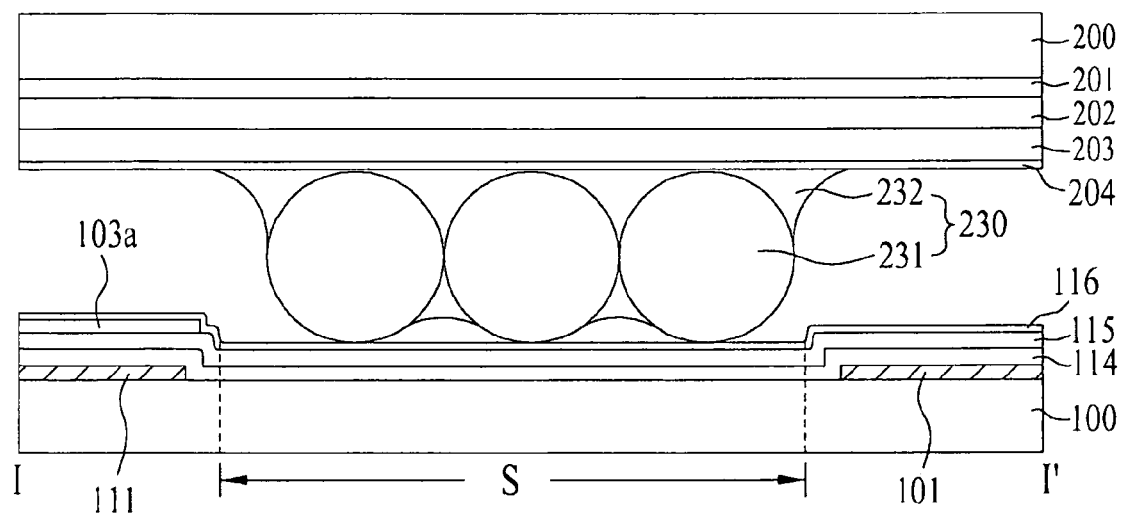
FIG. 6 is a sectional view illustrating a liquid crystal display device according to the second embodiment, taken along the line I-I' of FIG. 3.

FIG. 6 is a sectional view illustrating a liquid crystal display device according to a second embodiment, taken along the line I-I' of FIG. 3.

The configuration of the liquid crystal display device of the second embodiment is the same as that of the first embodiment, except that a spacer 230 composed of balls 231 further includes a solid 232. Accordingly, a more detailed explanation of the same will be omitted.

A process for forming the spacer 230 is as follows. A spacer-forming material, which includes a liquid material consisting of 2 to 20 wt % of a liquid thermosetting binder and a solvent, and 0.1 to 3.0 wt % of the balls, with respect to the total weight of the liquid material, is heated. In the process of heating, the solvent is volatilized, and the remaining balls are aggregated by means of the solid 232 cured from the liquid thermosetting binder, to form the spacer. The heating of the spacer-forming material is carried out at 80 to 300° C.

The solid 232 includes at least one selected from acrylic-based, urethane-based and epoxy-based organic compounds, or a silicone-based compound.

Specific examples of acrylic compounds include ethyl methacrylate, N-butyl methacrylate, isobutyl methacrylate, dicyclopentanyl methacrylate, benzyl methacrylate, glycidyl methacrylate, 2-hydroxyethyl methacrylate, methacrylic acid isobornyl methacrylate and styrene polymers, and combinations thereof.

By forming the spacer 230 using the spacer-forming material that includes the solid 232 and the balls 231, the balls 231 contained in the spacer 230 do not move inside the spacer-forming region S and can more efficiently prevent ball movement, as compared to the afore-mentioned first embodiment, thus preventing damage to the first alignment film 116 that faces the spacer 230, or breakage of the spacer 230 caused by impact applied upon movement.

Third Embodiment

Figure 7:
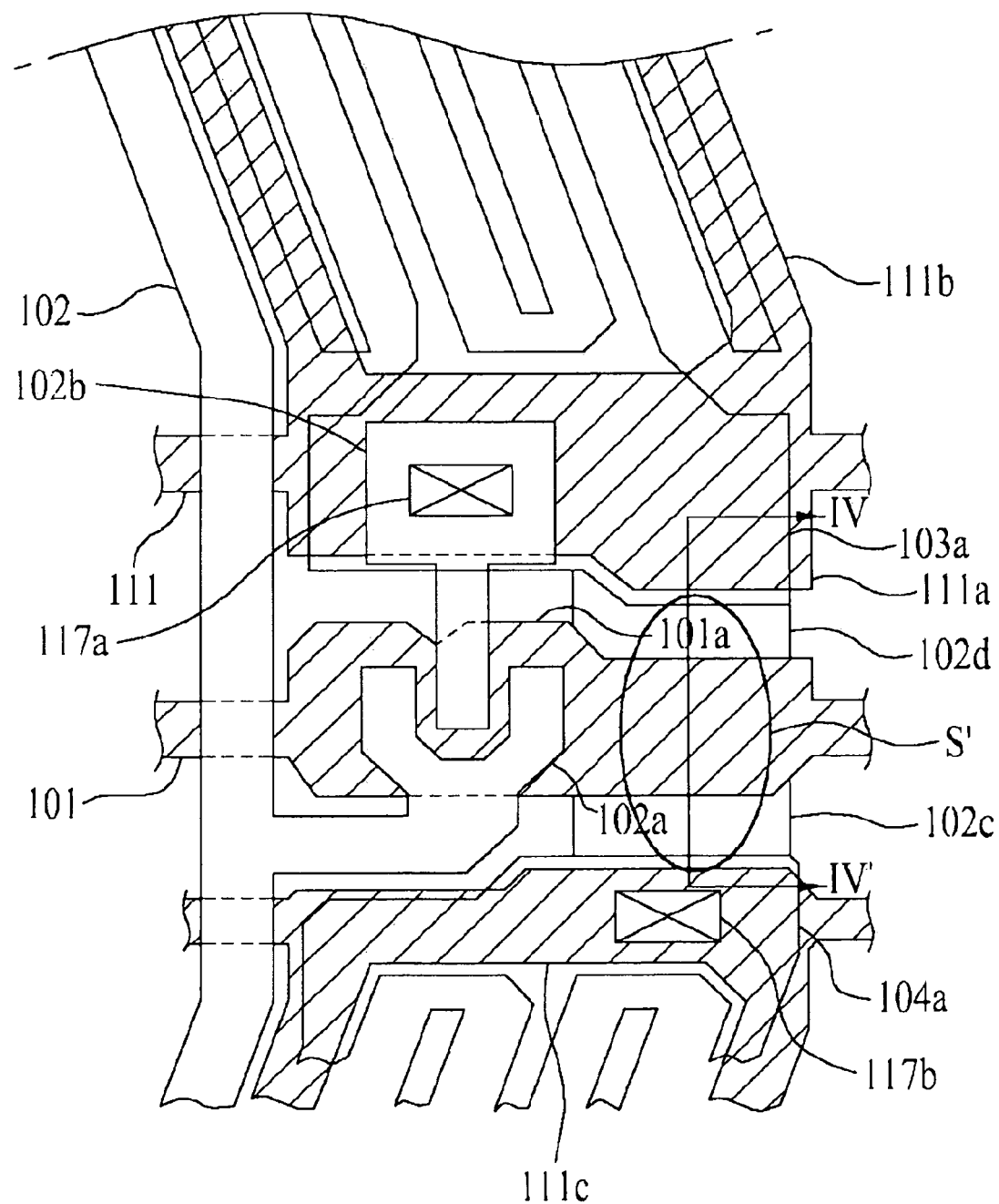
FIG. 7 is a plan view illustrating a liquid crystal display device according to a third embodiment of the present invention.
Figure 8:
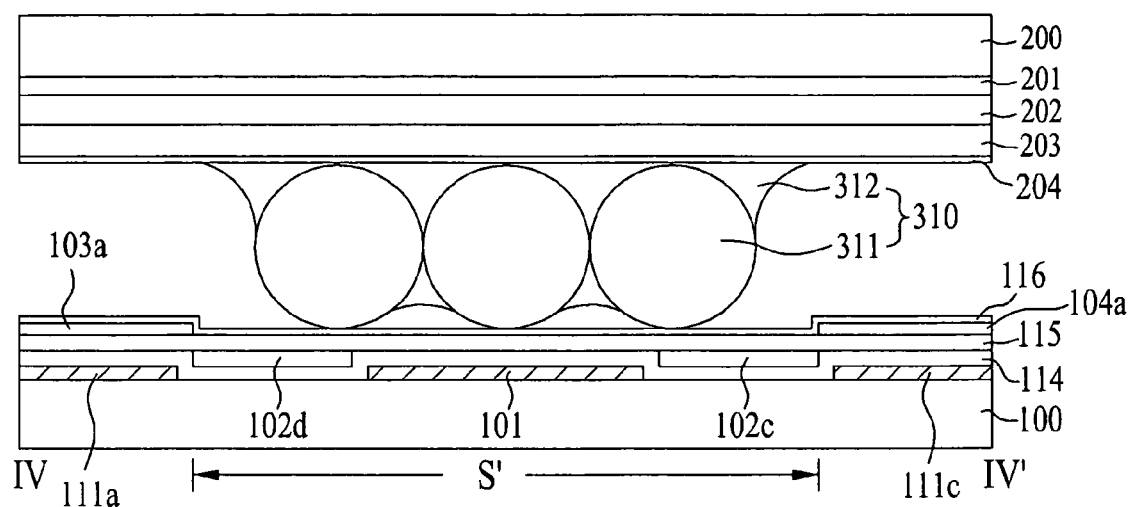
FIG. 8 is a sectional view taken along the line IV-IV' of FIG. 7.

FIG. 7 is a plan view illustrating a third embodiment of the present invention. FIG. 8 is a sectional view taken along the line IV-IV' of FIG. 7.

As shown in FIGS. 7 and 8, in the liquid crystal display device according to the third embodiment of the present invention, instead of additionally forming a depression in the gate line 101 or the common line 111, step compensation patterns 102c and 102d to compensate the step between the metal line-provided region and the metal line-free region are further formed therein, to define a spacer-forming region S' that has an overall-extended flat area.

The liquid crystal display device includes a passivation film 115 formed on the gate insulating film 114 including the data lines 102, a spacer 310 that comprises a plurality of balls 131 and a solid 312 to aggregate the balls 131 formed on the first or second substrate in the portion provided above the flat passivation film 115 including the step compensation patterns 102c and 102d, and a liquid crystal layer (not shown) filled between the first and second substrates.

The configuration and manufacturing method of the liquid crystal display device according to the third embodiment is the same as that of the second embodiment, except that the step compensation patterns 102c and 102d are used to form the extended spacer-forming region S'. A detailed explanation of the same is omitted.

Hereinafter, the method for forming spacers associated with the manufacture of the liquid crystal display device of embodiments of the present invention will be illustrated with reference to the annexed drawings.

Figure 9:
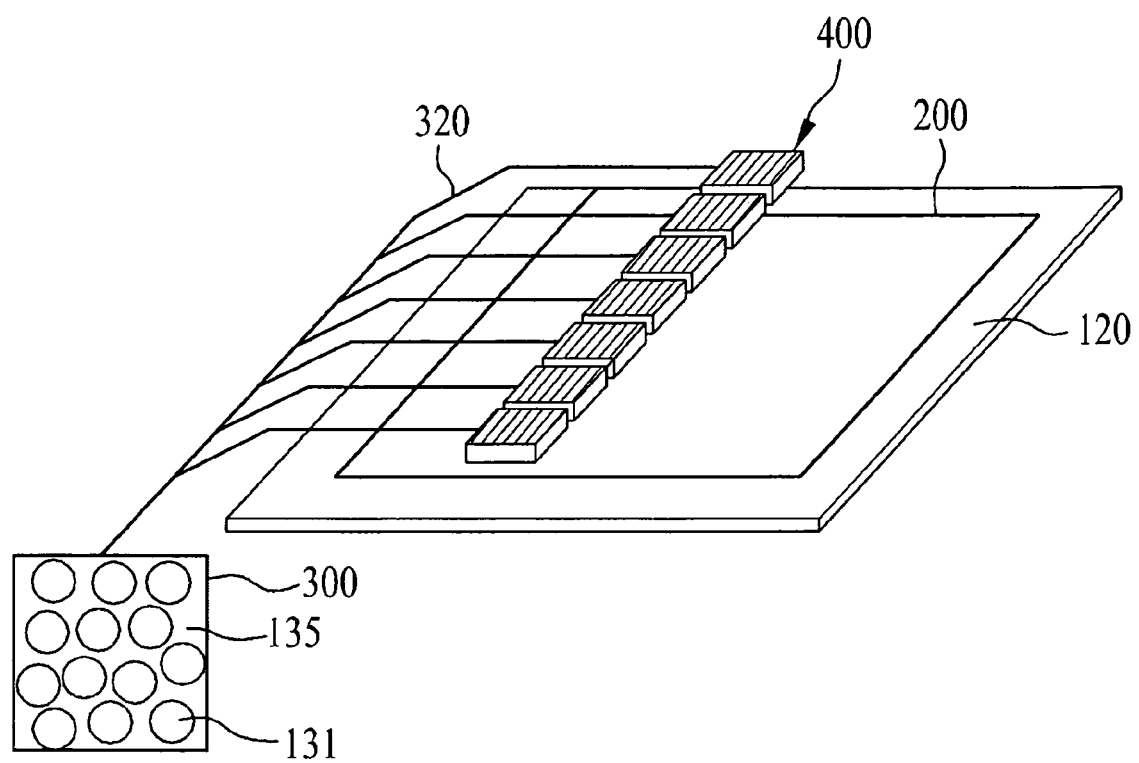
FIG. 9 is a schematic view illustrating an inkjet system used to form the spacers according to the embodiments of the present invention.

FIG. 9 is a schematic view illustrating an inkjet system used to form the spacers.

First, when a gas, e.g., nitrogen is injected into a supply tank 300 filled with a spacer-forming material wherein balls 131 are mixed with a liquid material 135 consisting of a liquid thermosetting binder (if needed, omitted, as mentioned in the first embodiment) and a solvent, the supply tank 300 undergoes an increase in internal pressure, which causes the spacer-forming material present in the supply tank 300 to be supplied through a plurality of pipes 320 into a plurality of inkjet heads 400.

The spacer-forming material supplied into the inkjet head 400 is sprayed through a nozzle (not shown) present inside each inkjet head 400 and is discharged in the predetermined portions of the second alignment film 204 (not shown in FIG. 9) arranged over the black matrix layer 201 (not shown in FIG. 9) on the second substrate 200. In this discharge process, since the spacer-forming material has slight spreadability and is oblate, it is cured through a heating process to form a spacer 130.

The pipe 320 is connected with a supply pipe (not shown) in the inkjet head 400. Thus, the spacer-forming material supplied via the pipe 320 flows through the supply pipe in the head 400. At this time, when a voltage applier 480 applies a voltage to a piezoelectric device (not shown), the piezoelectric device causes mechanical deformation, thus contracting the passage of the supply pipe and allowing the spacer-forming material to be discharged through the opposite nozzle (not shown).

At this time, at least one of the head 400 and a substrate stage 210 may be moved in a predetermined direction. Accordingly, a second substrate 200 with a large area is provided, the second substrate 200 is divided into portions and ink-jet processes through the heads 400 provided in the ink-jet system are carried out in respective portions.

An example wherein the liquid crystal display device employs an in-plane switching (IPS) mode is illustrated with reference to the drawings. In the cases where the afore-mentioned spacer is applied to TN-mode liquid crystal display devices in which pixel electrodes are formed at respective pixels and common electrodes are further formed on the second substrate, it is possible to obtain the same effects as in the example.

The liquid crystal display device and the method for manufacturing the same have the following advantages.

First, by forming a spacer including a plurality of balls in the region, which is low in level and flat, interposed between adjacent lines, although including spherical balls, the spacer does not deviate from the flat region due to the step. Accordingly, the spacer does not move from the portion provided inside the black matrix layer 51, thus preventing light leakage defects and decrease in aperture ratio caused by the spacer movement. Although the spacer includes no additional solid, the balls do not move toward other regions and stay in the predetermined region, thus structurally preventing defects derived from the ball movement. Furthermore, when the solid is further included in the spacer to improve adhesion, the ball movement can be prevented more efficiently.

Second, the spacer is fixed in the lower-level and flat region, thereby preventing problems (i.e., tearing of the alignment film or breakage of the spacer) caused by the ball movement.

Third, the spacer is fixedly formed in the flat region, the cell gap corresponding to the diameter of the balls contained in the spacer can be constantly maintained at respective liquid crystal panel regions, and display defects caused by non-uniform cell gap can thus be prevented. In this case, although the balls partially move, both the surface on which the balls are formed and the surface that faces the balls are planarized and negative effects caused by the ball movement can thus be prevented.

Fourth, the spacer includes the balls and a solid to aggregate them, thus preventing movement of the ball-comprising spacer and avoiding light leakage or galaxy defects.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
    a first substrate and a second substrate facing each other;
    a gate line and a common line arranged adjacent and parallel to each other on the first substrate;
    a data line crossing the gate line;
    a spacer comprising a plurality of balls, formed on the first or second substrate in a lower-height and flat region provided between the gate line and the common line; and
    a liquid crystal layer filled between the first substrate and the second substrate.

2. The liquid crystal display device according to claim 1, wherein the gate line or the common line adjacent to the region, where the spacer is formed, has a planar depression in which the spacer is embedded.

3. The liquid crystal display device according to claim 2, wherein the depression-containing, lower-height and flat region provided between the gate line and the common line has an area with horizontal and vertical widths in the range of 20 to 100 um.

4. The liquid crystal display device according to claim 1, wherein the spacer further comprises a solid to aggregate the balls together and adhere the balls to the first or second substrate, in the flat region defined by the gate line and the common line spaced apart from each other.

5. The liquid crystal display device according to claim 4, wherein the solid includes at least one selected from acrylic-based, urethane-based and epoxy-based organic compounds.

6. The liquid crystal display device according to claim 5, wherein the acrylic organic compound includes ethyl methacrylate, N-butyl methacrylate, isobutyl methacrylate, dicyclopentanyl methacrylate, benzyl methacrylate, glycidyl methacrylate, 2-hydroxyethyl methacrylate, methacrylic acid isobornyl methacrylate and styrene polymers, and combinations thereof.

7. The liquid crystal display device according to claim 4, wherein the solid includes a silicone compound.

8. The liquid crystal display device according to claim 4, wherein the spacer is formed by heating a spacer-forming material, comprising a liquid material consisting of 2 to 20 wt % of a liquid thermosetting binder and a solvent, and 0.1 to 3.0 wt % of the balls, with respect to the total weight of the liquid material, to volatilize the solvent and aggregate the balls by means of the solid cured from the liquid thermosetting binder.

9. The liquid crystal display device according to claim 1, further comprising:
    a black matrix layer formed on the second substrate in portions corresponding to the gate line and the data line, a portion provided by the common line and a portion provided between the gate line and the common line.

10. A liquid crystal display device comprising:
    a first substrate and a second substrate facing each other;
    a gate line and a common line arranged adjacent and parallel to each other on the first substrate;
    a gate insulating film on the first substrate such that the gate insulating film covers the gate line and the common line;
    a data line crossing the gate line;
    a step compensation pattern to compensate the step of the region defined by the gate line and the common line adjacent to each other;
    a passivation film formed on the gate insulating film including the step compensation pattern and the data line;
    a spacer formed on the first or second substrate in a portion provided above the flat passivation film including the step compensation pattern, the spacer comprising a plurality of balls and a solid to aggregate the balls; and
    a liquid crystal layer filled between the first substrate and the second substrate.

11. The liquid crystal display device according to claim 10, wherein the step compensation pattern is in the same layer as the data line.

12. The liquid crystal display device according to claim 10, further comprising:
    a black matrix layer formed on the second substrate in portions provided by the gate line, the common line and the data line and a portion provided between the common line and the gate line.

13. The liquid crystal display device according to claim 10, wherein the solid includes at least one selected from acrylic-based, urethane-based and epoxy-based organic compounds.

14. A method for manufacturing a liquid crystal display device comprising:
    preparing a first substrate and a second substrate;
    forming a gate line and a common line on the first substrate such that the gate line and common line extend adjacent and parallel to each other;
    forming a data line such that the data line crosses the gate line;
    inkjetting a spacer-forming material comprising a plurality of balls in a relatively lower-height and flat region provided between the gate line and the common line on the first or second substrate to form a spacer; and forming a liquid crystal layer between the first substrate and the second substrate and joining the first substrate to the second substrate.

15. The method according to claim 14, wherein the step of forming the gate line and the common line is carried out by forming the gate line and the common line, each having a smaller width of a portion adjacent to the region, where the spacer is formed, than the widths of other portions, such that the gate line or the common line adjacent to the region where the spacer is formed has a planar depression in which the spacer is embedded.

16. The method according to claim 14, wherein the spacer-forming material comprises a plurality of balls and a liquid solvent, wherein the balls are present in an amount of 0.1 to 3.0 wt %, with respect to the total weight of the solvent, wherein the spacer-forming material further comprises a liquid thermosetting binder in an uncured state of a solid.

17. The method according to claim 16, further comprising: after the ink-jetting the spacer-forming material, heating the spacer-forming material at a temperature of 80 to 300° C. to volatilize the solvent.

18. A method for manufacturing a liquid crystal display device comprising:

preparing a first substrate and a second substrate;

forming a gate line and a common line on the first substrate such that the gate line and the common line are arranged adjacent and parallel to each other;

forming a gate insulating film on the first substrate such that the gate insulating film covers the gate line and the common line;

forming a data line such that the data line crosses the gate line, and forming a step compensation pattern to compensate the step of the region defined by the gate line and the common line adjacent to each other, on the gate insulating film;

forming a passivation film on the gate insulating film including the step compensation pattern and the data line;

ink jetting a spacer-forming material on the first or second substrate in a portion provided above the flat passivation film including the step compensation pattern, wherein the spacer-forming material comprises a plurality of balls and a solid to aggregate the balls, to form a spacer; and forming a liquid crystal layer between the first substrate and the second substrate, and joining the first substrate to the second substrate.

19. The method according to claim 18, further comprising: forming a black matrix layer on the second substrate in portions provided by the gate line, the common line and the data line and a portion provided between the common line and the gate line.

20. The method according to claim 18, further comprising: after the ink jetting of the spacer-forming material, heating the spacer-forming material at a temperature of 80 to 300° C. to volatilize the solvent and cure the liquid thermosetting binder into a solid, so that the balls are aggregated together and adhered on the first or second substrate.

* * * * *